United States Patent [19]
Goel

[11] Patent Number: 5,961,141
[45] Date of Patent: Oct. 5, 1999

[54] PIN ASSEMBLY

[75] Inventor: Pankaj Goel, St. Charles, Ill.

[73] Assignee: Caterpillar Inc., Peoria, Ill.

[21] Appl. No.: 08/978,829

[22] Filed: Nov. 26, 1997

[51] Int. Cl.[6] ........................................................ B60D 1/01
[52] U.S. Cl. ........................................... 280/515; 403/162
[58] Field of Search .................................. 280/400, 515; 403/161–163, 157, 158; 384/563, 571, 585, 626

[56] References Cited

U.S. PATENT DOCUMENTS

| | | | |
|---|---|---|---|
| 4,629,350 | 12/1986 | Siewert | 403/11 |
| 4,772,150 | 9/1988 | Horton | 403/39 |
| 4,815,191 | 3/1989 | Garman | 29/434 |
| 5,044,812 | 9/1991 | Ardelt | 403/154 |
| 5,366,299 | 11/1994 | Hughes | 384/571 |
| 5,525,001 | 6/1996 | Perkins | 403/157 |

OTHER PUBLICATIONS

A pin arrangement as disclosed in print identified as 3V0119 Hitch GP Articulated which appears in a Parts Book for Caterpillar 950F Whl Ldr (1992).

*Primary Examiner*—Robert J. Oberleitner
*Assistant Examiner*—C. T. Bartz
*Attorney, Agent, or Firm*—William C. Perry

[57] ABSTRACT

In the pinned connections between frame members of articulated machines, it is typical to utilize one or more pin assemblies that have one or more spaces between the various components in the pin assembly. The present invention comprehends a pin assembly 10 that utilizes a first plurality of fasteners 82 to secure a first lock plate 72 to one of a pair of frame members 12 and 18. A first shim assembly 86 is included to remove any space between components along a first path of force transfer. A second plurality of fasteners 92 is utilized to mount a second lock plate 90 to a pin member 44. A second shim assembly 94 is included to remove any space between components along a second path of force transfer. The fasteners 82 and 92 work in conjunction with one another to greatly reduce flexing, and thereby the tendency for the fasteners to loosen, that occurs in a pin assembly 10 due to the transfer of forces therethrough.

15 Claims, 1 Drawing Sheet

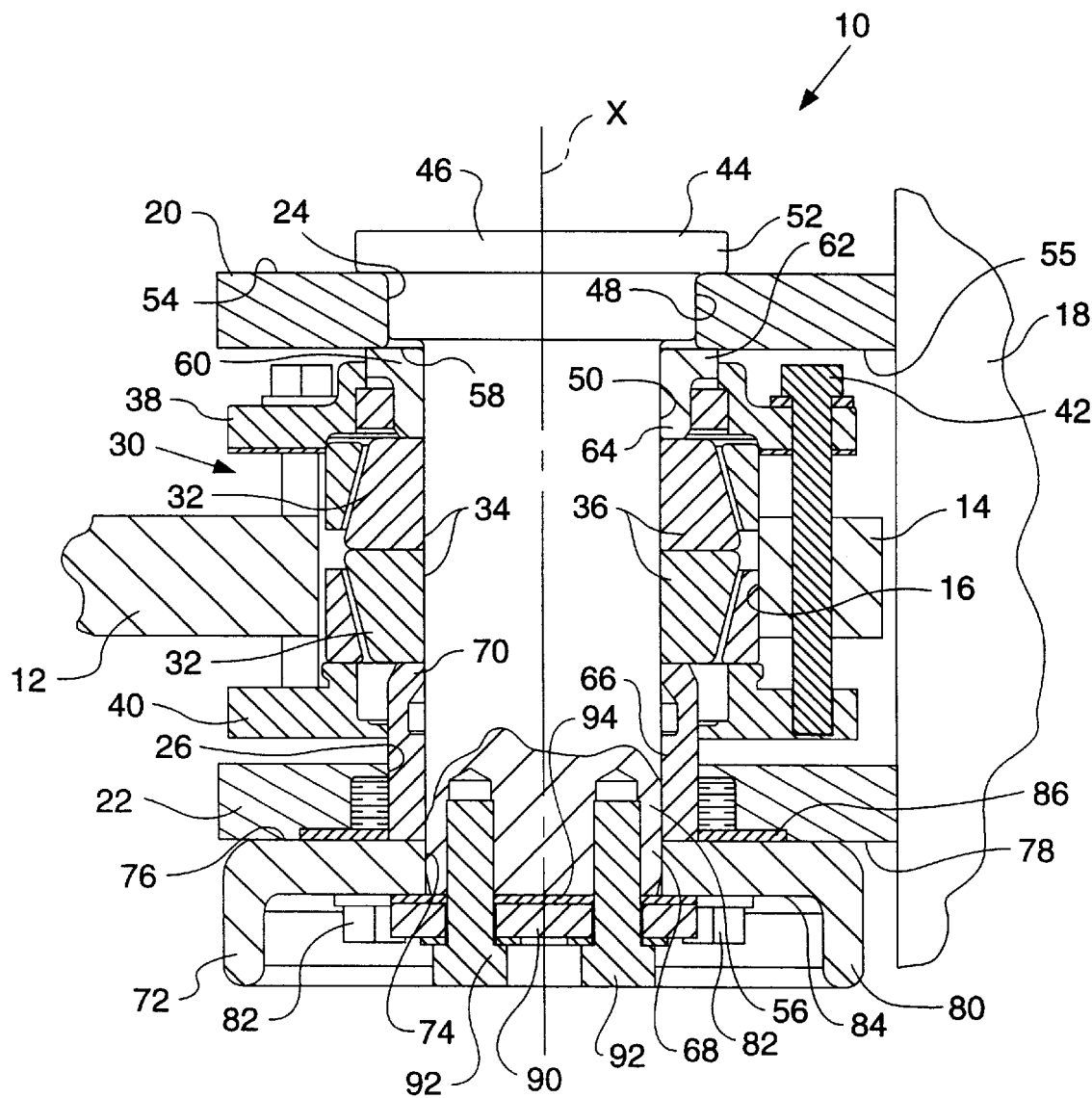

PIN ASSEMBLY

TECHNICAL FIELD

This invention relates to a pin assembly and more particularly to a pin assembly for use in a hitch assembly for an articulated work machine.

BACKGROUND ART

It is common in the construction industry to employ a machine that has a front and rear frame that are pivotally mounted to one another for relative movement about a pivot axis. Each frame defines a hitch portion in the area of articulation and each hitch portion is pivotally mounted to one another about a common axis. Typically the hitch will include an upper and lower hitch portion, each of which is pinned together by a hitch pin assembly. It is common practice to utilize upper and lower pin assemblies that are of different construction to accommodate the various types of loading transmitted between the two frames as a result of machine operation. While both pin assemblies must accommodate relative rotation between the frame members, the lower pin assembly is typically designed to accommodate the bulk of the radial and thrust loading that occurs between the frame members.

The design of the pin assemblies included in the lower hitch portion has typically included a pin member that is positioned in aligned bores between a pair of frame members. One frame member typically defines a single plate that is positioned between a pair of spaced apart plates defined by the other of the frame members. A bearing assembly is mounted in the single plate and a pair of spacers are positioned on opposite sides thereof and extend outwardly to contact each of the plates of the second frame. A first set of bolts mounts a lock plate to the second frame member to capture the spacers and the bearing assembly between spaced plates. A pin assembly is positioned within the aligned bores and has a first end portion that engages one of the spaced plates and a second end portion that is secured to the lock plate by a second plurality of bolts. In these designs, in order to accommodate manufacturing tolerances of the various components, the length of the pin is such that it stops short of the lock plate and creates a space therebetween.

During the operation of the machine, and subsequent transfer of forces between the two frames, the various components in the pin assembly are caused to flex with respect to one another. This flexing is accentuated in the lower pin assembly due to the space that exists between the pin and the lock plate. As a result, the mounting bolts that secure the lock plate to the pin and the second frame tend to loosen. This in turn, results in the loss of the bolts and the failure of the hitch pin assembly.

The present invention is directed to overcoming one or more of the problems as set forth above.

DISCLOSURE OF THE INVENTION

In one aspect of the present invention a pin assembly is disclosed that includes a first frame member and a second frame member. The first frame member has a bore defined therein. The second frame member includes first and second plates, each of which has a bore defined therein. The first and second plates are spaced from one another and are positioned on opposite sides of the first frame member with the bores thereof aligned with the bore in the first frame along a common axis. A bearing assembly is positioned within the bore of the first frame member, also along the common axis. A first lock plate is included that has first and second surfaces and a bore defined therethrough. The first lock plate is positioned with the first surface thereof engaged with an outer surface defined by the second plate of the second frame member. The bore of the first lock plate is also positioned along the common axis. A pin member is included that has a first and second end portion. The pin member is positioned within the aligned bores with the first end portion thereof engaging the first plate of the second frame member. The second end portion terminates at a location that is substantially flush with the second surface of the first lock plate. A first spacer is included that has a first end portion engaged with an inner surface of the first plate of the second frame and a second end portion engaged with the bearing assembly. Likewise, a second spacer is included that has a first end portion engaged with the first surface of the first lock plate and a second end portion engaged with the bearing assembly. A first fastening means is utilized for securing the first lock plate to the second plate of the second frame. A second lock plate is included that is positioned about the common axis in contact with the second surface defined by the first lock plate in overlying relationship to and in contact with the second end portion of the pin member. A second fastening means is utilized for securing the second lock plate to the second end portion of the pin member. The first and second fastening means work in conjunction with one another, to secure the pin member between the first plate of the second frame member and the second lock plate with substantially no space therebetween.

In another aspect of the present invention a pin assembly is disclosed for pivotally mounting a first frame member to a second frame member. Each frame member defines a bore that is positioned about a common pivot axis. A bearing assembly is positioned within the bore of one of the first and second frame members, the bearing assembly defines a bore that is also positioned along the common axis. A first lock plate is included that has a first and second surface and a bore formed therethrough. The lock plate is positioned with the first surface thereof engaged with an outer surface of one of the frames with the bore thereof aligned along the common axis. A spacer assembly is adapted for positioning between the bearing assembly and the respective frame members. A pin member is included that has a first and second end portion and is positioned within the aligned bores with a first end portion engaging the first plate of the second frame and the second end portion terminating at a location that is substantially flush with the second surface of the first lock plate. A second lock plate is adapted for engagement with the second surface of the first lock plate in overlying relationship to the bore and in contact with the second end portion of the pin member. A first fastening means is provided for securing the first lock plate to one of the first and second frames in a manner to secure the spacer assembly and the bearing assembly between the first and second frames with no space therebetween. A second fastening means is utilized for securing the pin member to the first lock plate with no space between the interface between the first end portion of the pin and the other of the first and second frames and the second lock plate.

With a pin assembly as set forth above, two independent pluralities of fasteners are utilized to secure the pin assembly to the first and second frame members. One plurality of fasteners utilizes a shim pack to take up any space that might exist between the components that extend between the first lock plate and the first plate of the second frame, while the second plurality of fasteners utilizes a shim pack to remove any space between the first end of the pin and the second lock plate. By removing the space between the components in this manner, forces are transmitted through pin assembly in a manner wherein flexing of the components is greatly reduced or eliminated altogether. In doing so, the tendency of the fasteners to loosen as a result of the flexing is also alleviated.

BRIEF DESCRIPTION OF THE DRAWINGS

The drawing discloses a diagrammatic section view of a pin assembly that embodies the principles of the present invention.

BEST MODE FOR CARRYING OUT THE INVENTION

Referring now to the drawing, a pin assembly, generally indicated at 10, is shown positioned between a pair of frame members to mount the frame members for pivotal movement with respect to one another about a pivot axis X. A first frame member 12 defines a single plate 14 that has a bore 16 extending therethrough. The second frame member 18 defines a pair of spaced apart plates, the first plate 20 being positioned above the plate 14 of the first frame and a second plate 22 being positioned below plate 14. The first and second plates 20 and 22 each define a bore, 24 and 26 respectively, that extends therethrough. The plates 14, 20 and 22 of the respective frame members are arranged such that the bores 16, 24 and 26 are aligned with one another along the common axis X. While only one pin assembly is shown and described herein, it is to be understood that another pin assembly is typically positioned between the frame members at a location that is spaced from pin assembly 10 to complete the hitch assembly.

A bearing assembly, generally shown at 30 is positioned within the bore 16 of the first frame member 14. The bearing assembly includes a pair of inner races or cones 32 that define coincident bores 34 and are positioned along the axis X. A pair of cup members, or outer races 36 are positioned between the cones and the bore 16 to accommodate relative movement therebetween. The bearing assembly is captured by a pair of end plates 38 and 40 that form a bearing cage which is in turn mounted to the plate 14 by a plurality of fastening members, or bolts 42.

A pin member 44 is positioned within the bores 34 defined by the cones 32. The pin member 44 has a first end portion 46 that defines a plurality of stepped diameters 48 and 50. The first diameter 48 is positioned within the bore 24 defined in the first plate 20 of the second frame member 18, while an enlarged outer end portion 52 is positioned for engagement with an outer surface 54 of the first plate member 20. The second diameter 50 is substantially continuous and extends to a second end portion 56 of the pin member 44. The interface between the first and second diameters defines a radially directed face 58.

A first spacer 60 is positioned about the pin member 44 at a location that places a first end portion 62 of the first spacer into contact with an inner surface 55 of the first plate 20. A second end portion 64 is positioned for engagement with one of the cone members 32 of the bearing assembly 30.

A second spacer 66 is also positioned about the pin member 44 and defines a first end portion 68 that is located within the bore 26 defined by the second plate 22 and a second end portion 70 that is engaged with the other of the cone members 32 of the bearing assembly 30.

A first lock plate 72 is mounted to the second plate 22 of the second frame member 18. The first lock plate 72 has a bore 74 defined therethrough and defines a first surface 76 that engages an outer surface 78 of the second plate 22. The first lock plate 72 is positioned with the bore 74 aligned along the axis X with the second end portion 56 of the pin member 44 received within the bore 74. The first lock plate is substantially cup-shaped having an outwardly extending flange 80 that extends away from the second plate 22.

A first plurality of fasteners, such as bolts 82, extend through the first lock plate 72 and secure the first lock plate to the outer surface 78 of the second plate 22. The heads of the bolts 82 bear against a second surface 84 of the first lock plate and extends therefrom a distance that is no greater that the length of the flange 80 defined by the first lock plate.

A first shim pack 86 is positioned between first surface 76 of the first lock plate 72 and the outer surface 78 of the second plate 22. The shim pack is adjusted so that linear distance between the first and second spacers 60 and 66 and the bearing assembly 30 sandwiched therebetween is the same as the distance between an inner surface 55 of the first plate 20 of the second frame 18 and the first surface 76 of the first lock plate 72 when the first lock plate is secured to the second plate 22.

A second lock plate 90 is positioned in covering relationship to the bore 74 defined in the first lock plate 72. The second lock plate is secured to the second end portion 56 of the pin member 44 by a second plurality of fasteners, such as bolts 92. The second bolts 92 draw the enlarged end portion 52 of the pin member against the outer surface 54 of the first plate 20. A second shim pack 94 is positioned between the end 56 of the pin member 44 and the second lock plate 90 to take up any space that may exist therebetween.

Industrial Applicability

During initial installation of the pin assembly 10, the bores 16, 24 and 26 of the respective frame members 12 and 18 are aligned along the common axis X. With the bearing assembly 30 installed on the first frame member 12, the pin member 44 is positioned within the aligned bores 34 with the first end portion 46 engaged with the first plate 20 of the second frame 18. The first spacer 60 is positioned between the bearing assembly 30 and the inner surface 55 of the first plate 20. The first locking plate 72 is positioned about the pin member 44 with the first surface 76 thereof in engagement with the outer surface 78 of the second plate 22, capturing the second spacer 66 between the first lock plate 72 and the bearing assembly 30. The first shim pack 86 is positioned between the first lock plate 72 and the outer surface 78 of the second plate 22. The first shim pack is adjustable to make the distance between the respective first end portions 62 and 68 of the respective spacers 60 and 66 equal to the distance between the inner surface 55 of the first plate 20 and the first surface 76 of the first lock plate 72. The first bolts 82 are then installed urging the first lock plate 72 against the second plate 22, and forcing the spacers and the bearing assembly snugly against the first plate 20. The second lock plate 90 is then positioned in overlying relationship to the pin member 44 and the bore 74 in the first lock plate. A second shim pack 94 is positioned between the second end portion 56 of the pin member 44 and the second lock plate 90. The second shim pack 94 is adjusted so that the distance between the enlarged end portion 52 of the pin member 44 and the second surface 84 of the first lock plate 72 is equal to the distance between the outer surface 54 of the first plate 20 of the second frame 18 and the second surface 84 of the first lock plate 72.

With this pin assembly, the first and second fastening means 82 and 92 work in conjunction with one another to create a path between the respective frame members having no spaces between the various components, through which loads may be transferred. Since everything is solidly coupled together, the flexing that normally occurs in pin assemblies of this type during the transfer of forces is greatly reduced or eliminated altogether, thus maintaining the integrity of the pinned connection.

Other aspects, objects and advantages of this invention can be obtained from a study of the drawings, the disclosure and the appended claims.

I claim:

1. A pin assembly, comprising:

a first frame member having a bore defined therethrough;

a second frame member having first and second plates, each plate having a bore defined therethrough, said plates being positioned in spaced relation to one another on opposite sides of the first frame member with the bores thereof in alignment with the bore defined in the first frame member along a common axis;

a bearing assembly positioned within the bore of the first frame member, said bearing assembly defining a bore that is positioned along said common axis;

a first lock plate having first and second surfaces and a bore defined therethrough, said first lock plate being positioned with the first surface thereof engaged with an outer surface defined by the second plate of the second frame member with the bore being aligned along the common axis;

a pin member having first and second end portions and being positioned within the aligned bores along the common axis with the first end portion engaging an outer surface defined by the first plate of the second frame member and the second end portion terminating at a location substantially flush with the second surface of the first lock plate;

a first spacer having a first end portion engaged with an inner surface of the first plate of the second frame and a second end portion engaged with the bearing assembly;

a second spacer having a first end portion engaged with the first surface of the first lock plate and a second end portion engaged with the bearing assembly;

a first fastening means for securing the first lock plate to the second plate of the second frame;

a second lock plate positioned about the common axis in contact with the second surface defined by the first lock plate in overlying relationship to and in contact with the second end portion of the pin member; and a second fastening means for securing the second lock plate to the second end portion of the pin member, said second fastening means working in conjunction with the first fastening means to secure the pin member between the first plate of the second frame member and the second lock plate with substantially no space therebetween.

2. The pin assembly as set forth in claim 1 wherein first frame member is a front portion of an articulated work machine and the second frame member is a rear portion of the articulated work machine, said frame members forming a hitch assembly for the machine that is adapted for articulation about the common axis.

3. The pin assembly as set forth in claim 1 wherein the bearing assembly further includes a bearing cage having a pair of bearing members mounted therein, said bearing cage having a pair of end plates that are positioned on opposite sides of the first frame member and are secured to one another by a plurality of threaded fasteners to substantially center the bearing cage within the bore of the first frame member.

4. The pin assembly as set forth in claim 1 wherein the first lock plate has a cup-shaped configuration having a flange that extends outwardly from the second surface a distance that is at least equal to the height of the second fastening members.

5. The pin assembly as set forth in claim 1 wherein the first end portion of the pin member defines a plurality of stepped diameters and an enlarged outer end portion.

6. The pin assembly as set forth in claim 5 wherein the pin member is positioned within the aligned bores with the enlarged outer end portion in contact with the first plate of the second frame.

7. The pin assembly as set forth in claim 1 wherein a first shim assembly is positioned between the first lock plate and the second plate of the second frame member to eliminate any gaps between the first plate of the second frame member, the first spacer, the bearing assembly, the second spacer and the first surface of the first lock plate upon mounting the first lock plate to the second frame with the first fastening means.

8. The pin assembly as set forth in claim 6 wherein a second shim assembly is positioned between the first and second lock plates to eliminate any gaps between the first plate of the second frame and the second lock plate upon mounting of the second lock plate to the first lock plate with the second fastening means.

9. A pin assembly adapted for pivotally mounting a first frame member to a second frame member, each frame member defining a bore that is positioned about a common pivot axis, comprising:

a bearing assembly positioned within the bore of one of the first and second frame members, said bearing assembly defining a bore that is positioned along said common axis;

a first lock plate having a first and second surface and a bore formed therethrough, said lock plate being positioned with the first surface thereof engaged with an outer surface of one of the frames with the bore thereof aligned along the common axis;

a spacer assembly adapted for positioning between the bearing assembly and the respective frame members;

a pin member having first and second end portions and being positioned within the aligned bores with a first end portion engaging the other of the first and second frame members and the second end portion terminating at a location substantially flush with the second surface of the first lock plate;

a second lock plate positioned about the common axis and being adapted for engagement with the second surface of the first lock plate and the second end portion of the pin member;

a first fastening means for securing the first lock plate to said other of the frame members in a manner to secure the spacer assembly and the bearing assembly between the first and second frames and the first lock plate with no space therebetween; and a second fastening means for securing the pin member to the second lock plate with no space between the interface between first end portion of the pin and said other of the first and second frames.

10. The pin assembly as set forth in claim 9 wherein the first frame member includes a single plate member.

11. The pin assembly as set forth in claim 10 wherein the second frame member includes first and second plates that are spaced from one another and positioned on opposite sides of the first frame.

12. The pin assembly as set forth in claim 11 wherein the spacer assembly includes a first spacer that is positioned between the first plate of the second frame member and the bearing assembly and a second spacer that is positioned between the second plate of the second frame and the bearing assembly.

13. The pin assembly as set forth in claim 10 wherein the bearing assembly is a tapered roller bearing having a pair of cone members positioned about the pin member and a pair of cup members positioned about the cone members and a pair of end plates that mount the bearing assembly within the bore defined by the first frame member, said bearing assembly being adapted to accommodate a preselected amount of radial movement between the first and second frames.

14. The pin assembly as set forth in claim 11 wherein a first shim assembly is positioned between the first lock plate and the second plate of the second frame member to eliminate any gaps between the first plate of the second frame member, the first spacer, the bearing assembly, the second spacer and the first surface of the first lock plate upon mounting the first lock plate to the second frame with the first fastening means.

15. The pin assembly as set forth in claim 11 wherein a second shim assembly is positioned between the first and second lock plates to eliminate any gaps between the first end portion of the pin member and the second lock plate upon mounting of the second lock plate to the first lock plate with the second fastening means.

* * * * *